United States Patent Office 3,275,500
Patented Sept. 27, 1966

3,275,500
STABILIZED FUNGICIDAL COMPOSITIONS
Franco Pinamonti and Sergio Maccone, Milan, Italy, assignors to Montecatini Società Generale per l'Industria Mineraria e Chimica, Milan, Italy
No Drawing. Filed Oct. 28, 1963, Ser. No. 319,555
Claims priority, application Italy, Oct. 30, 1962, 21,323/62
6 Claims. (Cl. 167—22)

This invention relates to fungicidal compositions and more particularly to stable fungicidal compositions containing the manganese salts of alkylenedithiocarbamic acids.

Manganese salts of alkylendithiocarbamic acids have previously been suggested for fungicidal compositions since their spectrum against various phytopathogenic fungi give them certain advantages. These salts can be prepared according to known processes, for instance manganese ethylene-bis-dithiocarbamate can be prepared according the U.S. Patent No. 2,504,404 by the double exchange reaction between the sodium salt of ethylene-bis-dithiocarbamic acid and a soluble manganese salt, or according to French Patent No. 1,099,969 by the addition of a 10% manganese chloride solution to an aqueous solution of ammonium ethylene-bis-dithiocarbamate. The managanese salts are insoluble and the resultant precipitate is filtered and dried.

However, these manganese salts are not as stable as the corresponding sodium and the zinc salts. Under normal storage conditions deterioration and degradation proceed rather rapidly causing considerable loss of activity by compositions containing such compounds.

Such degradative reactions have in the past prevented the use of the manganese salts of the alkylene-bis-dithiocarbamic acids in commercial fungicidal preparations. Commercial preparations containing such salts cannot safely be labeled as to active contents since by the time the material has reached the field a considerable hiatus has occurred so that the original analysis and the labeling regarding active ingredients are no longer accurate.

In the past, various attempts have been made for the stabilization of the manganese salts of alkylene-bis-dithiocarbamic acids in fungicidal compositions. Attempts have been made to add inorganic reducing salts such as sulfides, disulfides and hyposulfides. Such stabilizing agents, however, do not appear to be sufficiently effective when they are in contact with the atmosphere under normal storage conditions. They rapidly lose their stabilization efficiency and compositions containing such stabilizers have not provided commercially acceptable fungicidal compositions.

Attempts have also been made to purify by various means and methods the manganese dithiocarbamic acid salts. It was believed that certain impurities resulting from the manufacturing operation might catalyze the reactions resulting in the degradation of these manganese salts. Precautions taken to prevent such impurities, while they have increased the costs of manufacture to an inordinate degree, have not succeeded in yielding materials useful for commercial formulation.

In addition to the problems with these manganese salts concerning their stability, it has been noted that the alkylenedithiocarbamic acids possess a certain degree of phytotoxicity. While this toxicity has been mild, it has been noted that there is a tendency for the materials to accumulate within the plant and prolonged treatment over an extensive period of time has resulted in decay of the plant.

It is an object of this invention to provide commercially acceptable stable fungicidal compositions containing manganese salts of alkylenedithiocarbamic acids.

A further object of this invention is to provide compositions that are fungicidal in character containing the alkylenedithiocarbamic acid manganese salts which are relatively free of phytotoxicity.

The above and further objects will be apparent from the detailed description of our invention which is based on the addition to manganese salts of alkylenedithiocarbamic acids of phenylenediamines as stabilizers.

We have found that the three isomers ortho, meta and para of phenylenediamine are endowed with a stabilizing action toward the manganese salts of the alkylenedithiocarbamic acids. This stabilizing action is sufficiently broad as to enable the preparation of commercially acceptable fungicidal compositions containing the manganese salts of alkylenedithiocarbamic acids. Additionally we have found that by the addition of these phenylenediamine stabilizing agents we considerably reduce the phytotoxicity of the manganese salts of the alkylenedithiocarbamic acids.

We report below data demonstrating the favorable action exercised by the formulations, which are the subject of the present invention, toward the phytotoxicity of the active principles. The tests were carried out according to the following procedure: Bean plants are grown under artificial light for 15 to 20 days. The treatment is applied only on the primary leaves by depositiong via a pipette five drops on each leaf (each drop containing 0.02—0.04 cc.) of the aqueous dispersion of the products being tested. The plants thus treated are kept under artificial light and after 7 or 8 days the results are registered according to the following scale:
+ =phytotoxic damages
− =no phytotoxicity (comparable to the untreated controls)

TABLE I.—PHYTOTOXICITY OF STABILIZED AND UNSTABILIZED MANGANESE ETHYLENE-BIS-DITHIOCARBAMATE

| Product used for treatments | Percentage wt./wt. of 88% technical Mn ethylene-bis-dithiocarbamate in the suspensions used for the treatments | | |
|---|---|---|---|
| | 4% | 2% | 1% |
| A* | + | + | + |
| A+2% metaphenylene-diamine | − | − | − |
| A+1% metaphenylene-diamine | − | − | − |

*A=technical ethylene-bis-dithiocarbamate of manganese, containing 88% of active substance.

The phenylenediamines can be added to the manganese salts of the alkylenedithiocarbamic acids during a stage of their preparation, for instance after precipitation and separation through filtration or centrifugation, when they form a wet paste prior to drying. However, it has been found that it is preferable to add the stabilizer to the salts after they have been dried.

The mechanism of degradation of the manganese salts of alkylene-bis-dithiocarbamic acids is not perfectly known. However, it has been ascertained that the degradation is temperature-dependent and is accelerated by increase in temperature. It is further accelerated by the presence of moisture, and oxidizing agents are necessary for the reaction to proceed. The reaction appears to depend upon the instability of the group:

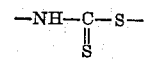

Carbon disulfide is a constant product of this degradation. The development of carbon disulfide can be taken as an index of the degradation for following its course and determining the stabilizing action of the various stabilizers.

reviously the action of the various stabilizers was tested by subjecting the samples to a wet air stream at rather igh temperature (from 70 to 90° C.) and then collect-1g and determining the weight of the carbon disulfide eveloped. The degradation is measured by the quantity f carbon disulfide developed during a given period of ime. However, we have noted that the results of the eterminations carried out at such high temperatures according to the method above mentioned do not always orrespond to the results obtained in practice, under normal room conditions. There are many materials which while affording stabilizing activity under the accelerated ests conducted at 70 to 90° C. gave completely unsatisactory results under normal room conditions. We have leveloped, for the selection of products having a stabilizng action, a quick method giving results that confirm what has been established under normal room conditions. The method which we have developed is described below:

About 5 g. of product are weighed and spread in a hin layer in a Petri dish of 10 to 15 cm. diameter. The ample is introduced into a climatic cell or into a highumidity room maintained at a constant temperature of 22° C. and above 90° humidity, but at a residual vacuum of about 50 mm. Hg. The specimens are kept under these conditions for 15 hours so that an isothermal equilibrium nay be achieved with the humidity that is present. Air is hen introduced into the cell; atmospheric pressure is maintained for 1 hour and drying is successively carried out through mechanical suction. The humidity is then once again saturated and maintained for 3 to 6 days. At the end of these elapsed periods, the sample is analyzed by determining the titre and the water content ($H_2O$) immediately after the drying operation. The titre s established by the Clarke method as described in Anal. Chem., 23, pages 1842–1846 (1951). Table II reports he data covering the accelerated degradation tests carried out on technical manganese ethylene-bis-dithiocarbamate used alone and with phenylenediamine following the above titration method.

TABLE II

| Samples | Starting titre | Titre after 3 days | Titre after 6 days |
| --- | --- | --- | --- |
| A | 88.7 | 71.13 | 66.5 |
| A+3% m FDA | 85.9 | 81.22 | 80.85 |
| A+2% m FDA | 86.50 | 81.36 | 81.24 |
| A=1% m FDA | 87.47 | 79 | 78 |
| A+3% p FDA | 85.5 | 77.31 | 74.20 |
| A+2% p FDA | 86.30 | 76.27 | 74.31 |
| A+1% p FDA | 87.36 | 75.2 | 72.4 |
| A+3% o FDA | 85.7 | 75.1 | 73.2 |
| A+2% o FDA | 86.41 | 74.3 | 73.1 |
| A+1% o FDA | 87.38 | 73.0 | 70.1 |

A = technical ethylene-bis-dithiocarbamate of manganese.
FDA = phenylenediamine.

In order to better illustrate this invention, appended below are examples wherein actual stability data of commercial formulations containing the manganese salts of ethylene-bis-dithiocarbamate are reported. It will be noted that the results agree very well with the results reported in Table II above ascertained by our accelerated method.

Table 1

98 g. of 86–88% (tech.) manganese ethylene-bis-dithiocarbamate are mixed together with 2 g. of (tech.) metaphenylene-diamine and then ground until a residue lower than 1% is obtained, using a 15,000 mesh/cmq. sieve. After 9 months of natural seasoning in commercial packing (polyethylene + pasteboard bag) a titre loss of 4–5% is noted instead of the 15–20% loss of the unstabilized technical product.

Example 2

95.5 g. of 86–88% (tech.) Mn ethylene-bis-dithiocarbamate are mixed together with 2 g. of (tech.) metaphenylene-diamine and 2.5 g. of suspending wetting agents selected in the alkaline alkylarylsulfonates group (for instance Na or Ca sulfonated naphthylbenzene; Na or Ca dodecylbenzosulfonate), alkylsulfates (for instance sodium laurylsulfate) and then ground until a residue lower than 1% through a 15,000 mesh/cmq. sieve is obtained. After 9 months of natural seasoning in a commercial packing (polyethylene + pasteboard bag), a titre loss of 4–5% is observed instead of the 15–20% loss noted on the unstabilized technical product.

Example 3

98 g. of 86–88% (tech.) Mn ethylene-bis-dithiocarbamate are mixed together with 2 g. of (tech.) orthophenylene-diamine, and successively ground. After 9 months of natural seasoning in commercial packing, a titre loss of 10–11% is observed instead of the 15–20% loss noted on the unstabilized technical product.

Example 4

98 g. of 86–88% (tech.) Mn ethylene-bis-dithiocarbamate are mixed together with 2 g. of (tech.) paraphenylene-diamine and successively ground. After 9 months of natural seasoning in commercial packing, a titre loss of 8–10% is observed instead of the 15–20% loss noted on the unstabilized technical product.

Example 5

99 g. of 86–88% ethylenebisdithiocarbamate of Mn are mixed together with 1 g. of technical metaphenylenediamine and then ground until a residue lower than 1% is obtained, using a 15,000 mesh/cmq. sieve.

After 9 months of natural seasoning in commercial packing (polyethylene + pasteboard bag) a titre loss of 4–5% is noted instead of the 15–20% loss of the technical product.

We have found that as long as the amount of the phenylenediamines exceeds 1%, sufficient stabilization of the manganese alkylenedithiocarbate is achieved to result in commercially acceptable formulations. Percentages higher than 3% do not yield any increased stability. The above amounts of the phenylenediamine are by weight of the manganese alkylenedithiocarbamate.

While we have noted the superiority of the m-phenylenediamine, the other phenylenediamines achieve a statistically significant amount of stabilization as to warrant their use either alone or in admixture with the preferred phenylenediamine.

The above examples are merely illustrative and are not meant to limit this invention in any manner.

We claim:
1. Stabilized fungicidal composition comprising manganese ethylene-bis-dithiocarbamate and m-phenylenediamine.
2. Stabilized fungicidal composition comprising manganese ethylene-bis-dithiocarbamate and p-phenylenediamine.
3. Stabilized fungicidal composition comprising manganese ethylene-bis-dithiocarbamate and o-phenylenediamine.
4. Stabilized fungicidal composition comprising manganese ethylene-bis-dithiocarbamate and phenylenediamine.
5. Stabilized fungicidal composition comprising manganese ethylene-bis-dithiocarbamate and at least 1% of phenylenediamine.
6. Stabilized fungicidal composition comprising manganese ethylene-bis-dithiocarbamate and at least 1% of m-phenylenediamine.

(References on following page)

References Cited by the Examiner

UNITED STATES PATENTS

| 2,665,285 | 1/1954 | Johnson | 167—22 |
| 2,791,605 | 5/1957 | Dorman | 167—22 |
| 2,974,156 | 5/1961 | Sobatski | 167—22 |

OTHER REFERENCES

Bunyatyan and Kamalyan, Chemical Abstracts, 44: (1950), p. 9699c.

Ivanov and Vlyanskaya, Chemical Abstracts 51: (1957), p. 14246a and b.

JULIAN S. LEVITT, *Primary Examiner.*

STANLEY J. FREIDMAN, *Examiner.*